United States Patent
Geis-Esser et al.

(10) Patent No.: US 11,207,970 B2
(45) Date of Patent: Dec. 28, 2021

(54) INTEGRATED DRIVE UNIT HAVING AN ELECTRIC DRIVE AND A MECHANICAL BRAKE

(71) Applicant: KNORR-BREMSE Systeme fuer Nutzfahrzeuge GmbH, Munich (DE)

(72) Inventors: Daniel Geis-Esser, Munich (DE); Alexander Koch, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 16/766,354

(22) PCT Filed: Nov. 22, 2018

(86) PCT No.: PCT/EP2018/082233
§ 371 (c)(1),
(2) Date: May 22, 2020

(87) PCT Pub. No.: WO2019/101861
PCT Pub. Date: May 31, 2019

(65) Prior Publication Data
US 2020/0376950 A1    Dec. 3, 2020

(30) Foreign Application Priority Data

Nov. 24, 2017  (DE) ............ 10 2017 221 108.3

(51) Int. Cl.
| | |
|---|---|
| *B60K 7/00* | (2006.01) |
| *B60K 17/04* | (2006.01) |
| *B60L 7/26* | (2006.01) |
| *B61H 11/14* | (2006.01) |
| *B60T 1/06* | (2006.01) |
| *B61C 3/00* | (2006.01) |

(52) U.S. Cl.
CPC .......... *B60K 7/0007* (2013.01); *B60K 17/046* (2013.01); *B60L 7/26* (2013.01);
(Continued)

(58) Field of Classification Search
None
See application file for complete search history.

(56) References Cited

U.S. PATENT DOCUMENTS

| | | |
|---|---|---|
| 2010/0116573 A1 | 5/2010 | Kim |
| 2014/0144718 A1* | 5/2014 | Mair .................... H02K 7/116 180/55 |

(Continued)

FOREIGN PATENT DOCUMENTS

| | | |
|---|---|---|
| DE | 100 54 368 A1 | 5/2002 |
| DE | 10 2004 040 357 A1 | 2/2006 |

(Continued)

OTHER PUBLICATIONS

International Search Report (PCT/ISA/210) issued in PCT Application No. PCT/EP2018/082233 dated Mar. 19, 2019 with English translation (five (5) pages).

(Continued)

*Primary Examiner* — Colby M Hansen
(74) *Attorney, Agent, or Firm* — Crowell & Moring LLP

(57) ABSTRACT

A drive and deceleration unit has a mechanical brake and an electric drive. The mechanical brake and the electric drive are provided as a unit for acting on a single wheel connection. A method provides for the open-loop and/or closed-loop control of such a drive and deceleration unit.

15 Claims, 2 Drawing Sheets

(52) U.S. Cl.
CPC ............... *B60T 1/062* (2013.01); *B61C 3/00* (2013.01); *B61H 11/14* (2013.01); *B60K 2007/0061* (2013.01)

(56) References Cited

U.S. PATENT DOCUMENTS

2015/0065293 A1* 3/2015 Ando ................. B60K 7/0007
477/1
2019/0003534 A1 1/2019 Estepa Rodriguez

FOREIGN PATENT DOCUMENTS

| | | |
|---|---|---|
| DE | 10 2009 035 176 A1 | 2/2011 |
| DE | 10 2010 030 827 A1 | 1/2012 |
| GB | 2 443 687 A | 5/2008 |
| WO | WO 2017/009512 A1 | 1/2017 |

OTHER PUBLICATIONS

German-language Written Opinion (PCT/ISA/237) issued in PCT Application No. PCT/EP2018/082233 dated Mar. 19, 2019 (six (6) pages).

German-language Office Action issued in German Application No. 102017221108.3 dated Dec. 14, 2017 (five (5) pages).

International Preliminary Report on Patentability (PCT/IB/326 & PCT/IB/373) issued in PCT Application No. PCT/EP2018/082233 dated Jun. 4, 2020, including document C2 (German-language Written Opinion (PCT/ISA/237 previously filed on May 22, 2020) (eight (8) pages).

\* cited by examiner

INTEGRATED DRIVE UNIT HAVING AN ELECTRIC DRIVE AND A MECHANICAL BRAKE

BACKGROUND AND SUMMARY OF THE INVENTION

The present invention relates to a unit having an electric drive and a mechanical brake for a utility vehicle and/or a rail vehicle.

FIG. 1 shows the conventional arrangement of a drive unit and a brake unit with their connections to a wheel according to the prior art in a schematic illustration, as explained below.

An e-drive unit 3 and a brake unit 4, which are formed as separate units, are conventionally provided for a driven wheel 2. In this case, a mechanical connection 23 is provided between the wheel 2 and the e-drive unit 3. An additional mechanical connection 24 is furthermore provided between the wheel 2 and the brake unit 4. The connections 23 and 24 are designed to transmit drive and brake forces between the wheel 2 and the e-drive unit 3 and the brake unit 4, respectively.

The e-drive unit 3 (according to the prior art) has an e-drive 31 and a control device 32, which is provided for controlling the e-drive 31. For this purpose, the e-drive 31 and the control device 32 are connected to one another by means of a connection 33 in order to transmit energy and signals.

The brake unit 4 (according to the prior art) has a mechanical brake 41 and a separate brake control 42, which is provided for controlling the brake 41. For this purpose, the brake 41 and the brake control 42 are connected to one another by means of a connection 43 in order to transmit energy and signals (i.e. data, current, possibly also hydraulic fluid or compressed air, and further signals, for example).

In the prior art described above, the electronic drive unit 3 and the brake unit 4 are provided separately from one another, although they act on the same wheel 2. They can therefore be seen as subsystems, which are separate from one another both topologically and systemically. This results in problems during the interaction of the two subsystems, in particular during the regulation or control of a braking procedure. Furthermore, in the prior art, many components are required due to the mutually separate subsystems, which is costly and complex and requires a large installation space. In particular, a separate control device must be provided for each subsystem.

An object of the invention is to provide a device and a method to eliminate the disadvantages of the prior art. This object is achieved by the independent claims.

Installation space is saved by constructing the e-drive unit and the brake unit (mechanical brake) as a single unit. Furthermore, only one connection needs to be provided between the unit and the wheel which is to be driven or braked.

The e-drive unit and the brake unit are preferably constructed as an integrated and compact unit.

The rotor of the e-drive is preferably formed as a component of the mechanical brake. This saves on components, which lowers production costs. The brake and the e-drive therefore have common parts. This means that a component belongs both to the e-drive and to the mechanical brake. In this case, this common component is the rotor of the e-drive. Further components can also belong both to the e-drive and to the mechanical brake.

A common control device is preferably provided, which is designed to control the mechanical brake and to control the e-drive. This saves on components, namely a further control device. Furthermore, the control or regulation of a braking procedure is thus simplified. With little computing time, a single control device for the mechanical brake and the e-drive is capable of coordinating the interaction between the mechanical brake and the e-drive in generator mode to reduce the wear on the mechanical brake. This is because it is possible for braking to take place without wear via the e-drive in generator mode. The common control device therefore preferably coordinates the interaction between the mechanical brake and the e-drive in such a way that the braking requirement is fulfilled to a maximum extent by the e-drive in generator mode. The mechanical brake is preferably only used when absolutely necessary (for example in the case of emergency braking, or in the final meters before the train or the utility vehicle is at a standstill).

The unit preferably has a common housing for at least the e-drive unit and the brake unit. The control device is preferably also integrated in this housing.

According to another configuration, the control device is arranged outside the common housing.

A gear for the e-drive is preferably provided in order to use the torque characteristic of the e-drive as optimally as possible in each rotational-speed range of the wheel. The performance is thereby increased, the system efficiency therefore maximized. The gear is preferably switchable.

According to another configuration, the gear is preferably not switchable but has a fixed transmission ratio.

The gear and the e-drive preferably also have common components. This means that a component belongs both to the e-drive and to the gear. This saves on components.

The gear and the mechanical brake preferably also have common components. This means that a component belongs both to the mechanical brake and to the gear. This saves on components. The common component is optionally the final gear stage.

In general, owing to the construction according to the invention, as many components as possible are able to fulfill a plurality of functions. Therefore, further components which are conventionally provided separately from one another are preferably also combined with one another. This reduces the number of components and saves on installation space since a more compact structure is enabled.

The gear is preferably formed as a planetary gear. A compact design is thus realized.

The connection between the wheel and the drive and deceleration unit according to the invention is preferably formed as a shaft which is decoupled from vibrations. The transmission of vibrations between the wheel and the drive and deceleration unit according to the invention is thus prevented or at least minimized.

The drive and deceleration unit is preferably assembled on the chassis of a utility vehicle or rail vehicle, whereby the vibrating mass is reduced.

The drive and deceleration unit is preferably assembled directly on the wheel, whereby a shaft between the drive and deceleration unit and the wheel is not required.

Even if a brake request can be realized by exclusive braking via the e-drive in generator mode, the mechanical brake is preferably also activated in the final meters before the train is at a standstill, or braking preferably takes place exclusively mechanically in the final meters before the train is at a standstill. Precise stopping, i.e. at precisely the specified point, is thus possible.

In the case of an emergency brake request, the mechanical brake is preferably activated immediately without previously checking whether the brake request could also be realized by the e-drive in generator mode alone. This saves on time and distance travelled in the event of emergency braking, since braking takes place as early as possible via all available means.

Although braking preferably takes place by means of the e-drive in generator mode as often as possible and as exclusively as possible, braking preferably additionally takes place via the mechanical brake if the energy converted into current by the e-drive in generator mode cannot be used or discharged.

According to another configuration, in the case described above, if the energy converted into current by the e-drive in generator mode cannot be used or discharged, braking takes place preferably exclusively via the mechanical brake.

DETAILED DESCRIPTION OF THE DRAWINGS

Figure 1:
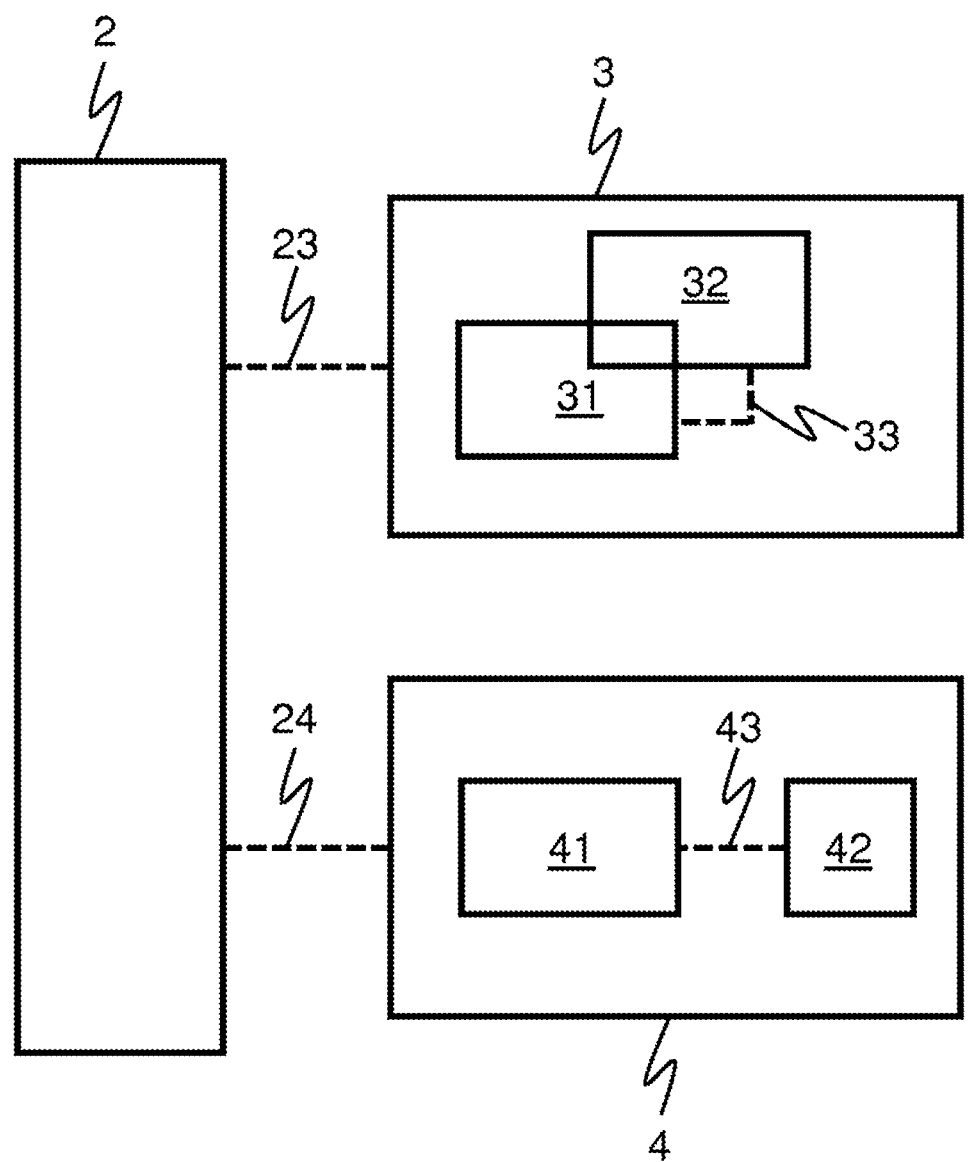
FIG. 1 shows the conventional arrangement of a drive unit and a brake unit with their connection to a wheel according to the prior art, as already explained in the introductory section.
Figure 2:
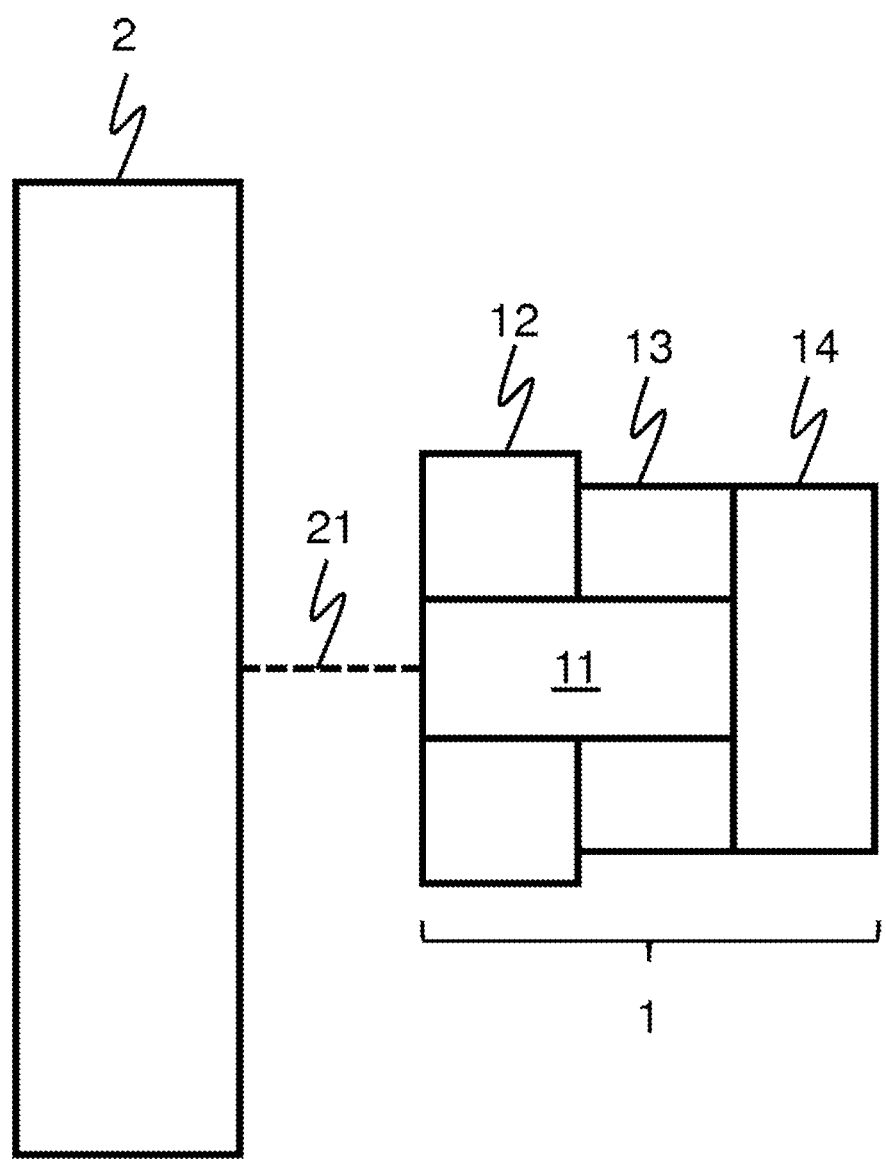
FIG. 2 shows an exemplary embodiment of the configuration according to the invention

The description below of FIG. 2 discusses, in particular, the differences from the arrangement shown in FIG. 1. FIG. 2 also shows a schematically illustrated wheel 2. A drive and deceleration unit 1 according to the invention is furthermore illustrated. In contrast to two connections 23, 24 according to the prior art (see FIG. 1), only a single connection 21 is provided between the wheel 2 and the drive and deceleration unit 1. An e-drive 11 is arranged centrally within the drive and deceleration unit 1. The embodiment shown here has an optional gear 13, which is arranged adjacent to the brake 12 and to the e-drive 11. If the wheel 2 is to be driven, the torque generated by the e-drive 11 is conducted via the gear 13 and, from there, by the connection 21 to the wheel 2. Although the option of a direct torque transmission from the gear 13 to the connection 21 is not illustrated in FIG. 2, it can still take place. FIG. 2 should simply be seen as a basic illustration which demonstrates an example of a basic arrangement of the various components.

If the wheel 2 is to be braked, a brake force must be applied to the connection 21 by the drive and deceleration unit 1. This occurs exclusively by means of the e-drive 11 in generator mode if the brake force request can be fulfilled thereby. However, if the braking action of the e-drive 11 in generator mode is insufficient, a braking force is additionally applied by the mechanical brake 12.

To control or regulate the interaction between the e-drive 11 and the mechanical brake 12, the drive and deceleration unit 1 has a control device 14 integrated therein. The control device 14 has, amongst other things, safety functions such as ABS and ESP functionality (in utility vehicles) or wheel slide protection (in rail vehicles).

LIST OF REFERENCE SIGNS

1 Drive and deceleration unit
11 E-drive
12 Brake
13 Gear
14 Control device (of the drive and deceleration unit 1)
2 Wheel
21 Connection between wheel 2 und drive and deceleration unit 1
23 Connection between wheel 2 und e-drive unit 3 (prior art)
24 Connection between wheel 2 und brake unit 4 (prior art)
3 E-drive unit (prior art)
31 E-drive (prior art)
32 Control device (prior art)
33 Connection between e-drive 31 and control unit 32
4 Brake unit (prior art)
41 Brake (prior art)
42 Brake control (prior art)
43 Connection between brake 41 and brake control 42

What is claimed is:

1. A drive and deceleration unit, comprising:
   a mechanical brake; and
   an e-drive, wherein
      the mechanical brake and the e-drive are provided as a unit for acting on a single wheel connection,
      the e-drive in generator mode exclusively brakes when a braking action corresponding to the brake request is achievable thereby, and
      the mechanical brake additionally brakes when the braking action corresponding to the brake request cannot be achieved by the e-drive alone.

2. The drive and deceleration unit as claimed in claim 1, further comprising:
   a common control device both for controlling the mechanical brake and for controlling the e-drive.

3. The drive and deceleration unit as claimed in claim 2, wherein
   the control device controls the drive and deceleration unit so that the braking action can be applied to the wheel connection either by:
   the mechanical brake alone,
   the e-drive alone, or
   a combination of the mechanical brake and the e-drive.

4. The drive and deceleration unit as claimed in claim 1, further comprising:
   a gear integrated in the unit.

5. The drive and deceleration unit as claimed in claim 4, wherein
   the gear is part of the e-drive, and/or a final gear stage is formed as a component of the mechanical brake.

6. The drive and deceleration unit as claimed in claim 4, wherein
   the gear is a planetary gear.

7. The drive and deceleration unit as claimed in claim 1, wherein
   the mechanical brake is a drum brake or disk brake and is activatable pneumatically, hydraulically or electromotively.

8. The drive and deceleration unit as claimed in claim 7, wherein
   the unit is provided for use in a utility vehicle or in a rail vehicle.

9. The drive and deceleration unit as claimed in claim 1, further comprising:
   a wheel connection provided as a rigid shaft or as a shaft which is decoupled from vibrations, wherein
   the drive and deceleration unit is provided for assembly on a vehicle chassis.

10. The drive and deceleration unit as claimed in claim 1, wherein
   the drive and deceleration unit is provided for direct assembly on a wheel.

11. The drive and deceleration unit as claimed in claim 1, wherein a rotor of the e-drive is formed as a component of the mechanical brake.

12. A method for controlling a drive and deceleration unit having a mechanical brake, an e-drive and a control device, the method comprising:
   (i) exclusively braking by the e-drive in generator mode when a braking action corresponding to the brake request is achievable thereby; and
   (ii) additionally braking via the mechanical brake when the braking action corresponding to the brake request cannot be achieved by the e-drive alone.

13. The method as claimed claim 12, further comprising:
   when exclusive braking by the e-drive in generator mode is sufficient to fulfill the brake request, additionally braking via the mechanical brake in a final braking section before the vehicle is at a standstill.

14. The method as claimed in claim 13, further comprising:
   in an event of an emergency brake request, immediately additionally activating the mechanical brake without checking whether the braking action corresponding to the brake request is achievable by the e-drive in generator mode alone.

15. The method as claimed in claim 12, further comprising:
   when the energy converted into current by the e-drive in generator mode cannot be used, additionally braking via the mechanical brake.

* * * * *